United States Patent [19]
Oda

[11] Patent Number: 5,640,005
[45] Date of Patent: Jun. 17, 1997

[54] ACTIVE TRIGONOMETRICAL DISTANCE MEASURING APPARATUS WITH DELAY CIRCUITS

[75] Inventor: Hajime Oda, Yotsukaido, Japan

[73] Assignee: Seiko Precision Inc., Japan

[21] Appl. No.: 508,834

[22] Filed: Jul. 28, 1995

[30] Foreign Application Priority Data

Jul. 28, 1994 [JP] Japan .................................. 6-176938

[51] Int. Cl.$^6$ ........................................... G01J 1/20
[52] U.S. Cl. ................................ 250/201.4; 250/201.6; 356/3.06; 396/80
[58] Field of Search ........................ 250/201.4, 201.6, 250/214 R, 214 A, 214.1; 356/5.13, 28.5, 5.11, 5.06, 3.11, 5.09, 358, 141.4, 363, 141.5, 380; 354/400–408; 340/555–557; 327/20, 141, 182–183, 514; 377/5–7, 12

[56] References Cited

U.S. PATENT DOCUMENTS

| | | | |
|---|---|---|---|
| 4,942,561 | 7/1990 | Ohishi et al. | 356/5.13 |
| 5,082,363 | 1/1992 | Nakanishi et al. | 250/201.6 |
| 5,157,435 | 10/1992 | Min et al. | 250/201.4 |
| 5,204,714 | 4/1993 | Nonaka et al. | 354/403 |
| 5,329,467 | 7/1994 | Nagamune et al. | 356/380 |

FOREIGN PATENT DOCUMENTS

| | | |
|---|---|---|
| 0281085 | 9/1988 | European Pat. Off. |
| 2007062 | 5/1979 | United Kingdom |

Primary Examiner—Que Le
Attorney, Agent, or Firm—Adams & Wilks

[57] ABSTRACT

An inexpensive and easily adjustable distance measuring apparatus judges whether an object is located at a far distance or at a near distance relative to a certain set distance. The distance measuring apparatus comprises an oscillator for generating pulses, a light emitting element for emitting light for a predetermined time in synchronization with the pulses generated by the oscillator, a plurality of light receiving elements disposed adjacent to each other to receive reflected light emitted by the light emitting element and reflected by an object whose distance is to be measured, a plurality of delay circuits connected to respective ones of the light receiving elements, and a phase discriminating circuit for comparing the phases of the output signals of each of the delay circuits. To minimize misjudgments caused by noise and unclear judgment in the case the object is located at the boundary between the far and near distances, a majority decision circuit is connected to the phase discriminating circuit for counting the High and Low output levels of the phase discriminating circuit during each predetermined time period to output a signal having a level corresponding to that which occurred most often during the predetermined time period.

14 Claims, 8 Drawing Sheets

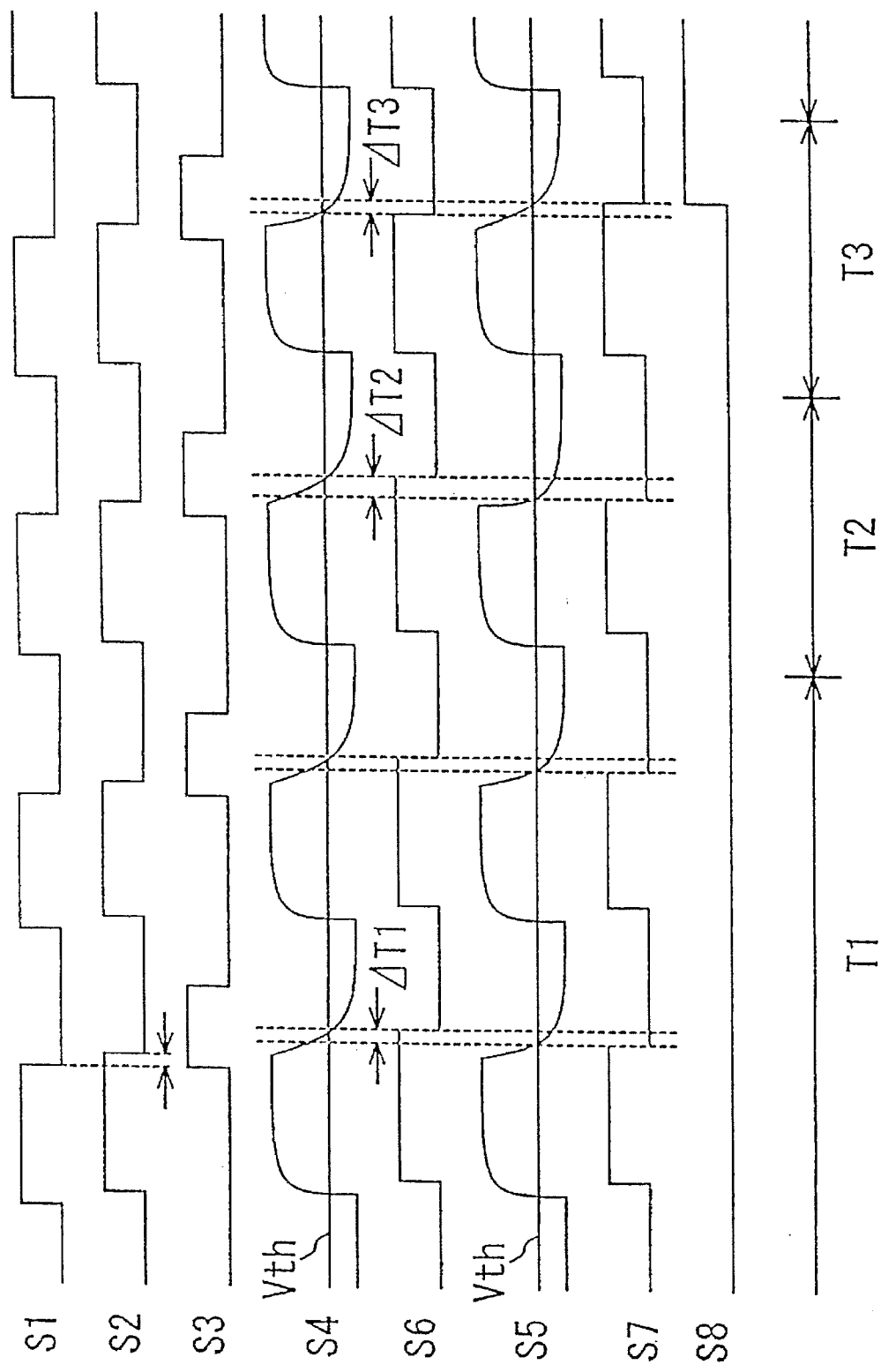

ACTIVE TRIGONOMETRICAL DISTANCE MEASURING APPARATUS WITH DELAY CIRCUITS

BACKGROUND OF THE INVENTION

The present invention relates generally to a distance measuring apparatus used in autofocus systems for cameras, human body detectors in crime prevention systems and the like.

More particularly, the invention relates to an active type distance measuring apparatus for measuring a distance by emitting an infrared beam from a light emitting portion and receiving the infrared beam reflected by a reflective object by means of a light receiving portion.

One known active type distance measuring apparatus for judging whether a reflective object is located at a far point or at a near point relative to a certain preset distance is disclosed, for example, in Japanese Unexamined Patent Application No. 59-148033. This apparatus measures a distance from a far point when the output signals of two phototransistors decrease, so that the far point is used for distance measurement when the output signal is insufficient.

A conventional active type distance measuring apparatus requires an amplifier having high amplification and a comparator, resulting in the drawback that the circuit structure becomes complicated and adjustment is difficult. In particular, such a simple distance measuring apparatus which differentiates between far and near points has had a problem in that the cost thereof is considerably high.

SUMMARY OF THE INVENTION

An object of the present invention is to provide an inexpensive and easily adjustable distance measuring apparatus which solves the aforementioned problems.

To solve the aforementioned problems, the distance measuring apparatus of the present invention comprises, in one embodiment, an oscillator, a light emitting element for emitting light for a predetermined time in synchronization with the output of the oscillator, a plurality of light receiving elements adjacent to each other for receiving reflected light emitted by the light emitting element, a delay circuit connected to each of the plurality of light receiving elements, and a phase discriminating circuit for comparing the phases of output signals of the plurality of delay circuits.

The distance measuring apparatus of the present invention may also have a majority decision circuit for counting the output level of the phase discriminating circuit at predetermined times to produce an output a majority of the output signal representing levels in order to minimize misjudgments caused by noise and unstable judgment in the case where the object is located at the boundary between the far and near distances.

BRIEF DESCRIPTION OF THE DRAWINGS

FIG. 4 is a timing chart of the first embodiment of the present invention.

DETAILED DESCRIPTION OF INVENTION

Figure 2:
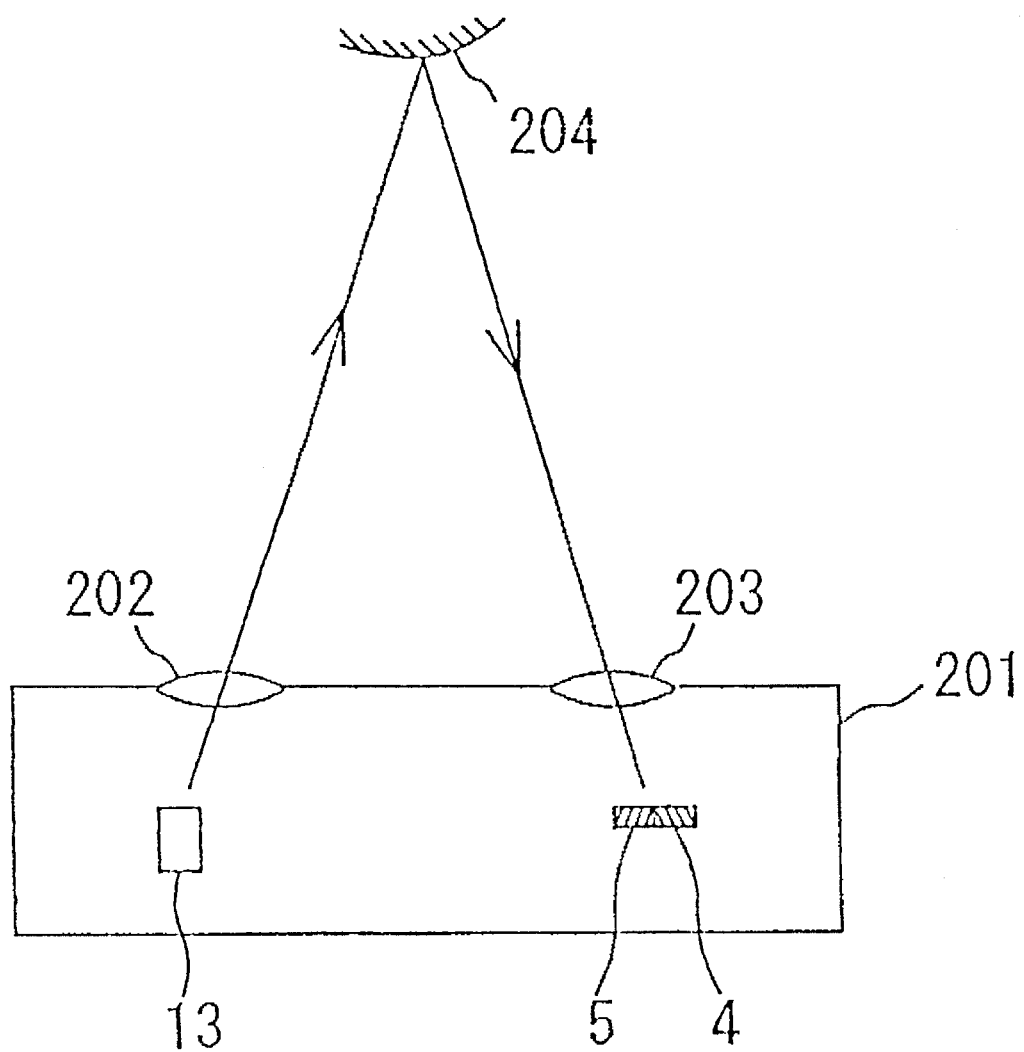
FIG. 2 is an explanatory view of the light emitting and light receiving elements of the present invention.

Several embodiments of the present invention will be explained in detail with reference to the accompanying drawings. However, before describing specific embodiments, the principle of operation of the distance measuring apparatus of the present invention will be explained with reference to FIGS. 2 and 3. Referring to FIG. 2, reference numerals 202 and 203 designate a light projecting lens and a light receiving lens provided in a case 201. At the rear of the light receiving lens 203, two light receiving elements 4,5, such as photodiodes or the like, are arranged adjacent to each other at a focusing surface of the lenses. Light emitted from a light emitting element 13, such as an infrared light emitting diode, is projected by the light projecting lens 202 and reflected by a reflective object 204 back toward and converged by the light receiving lens 203 to form a light spot on a light receiving element 4 or 5.

Figure 3A:
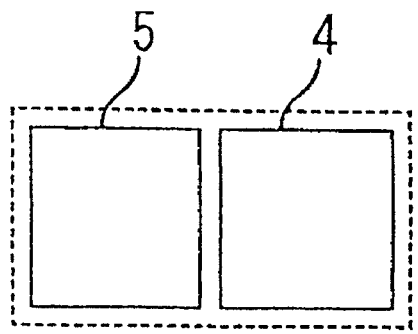
FIGS. 3(a)–3(d) are explanatory views showing different states of the light receiving element of the present invention.
Figure 3B:
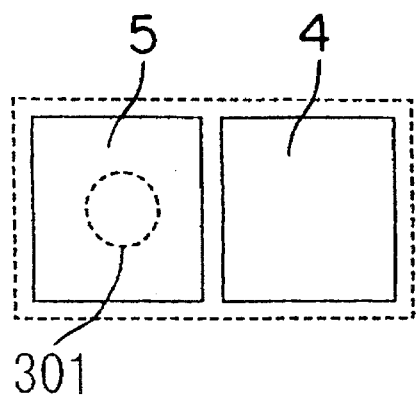
Figure 3C:
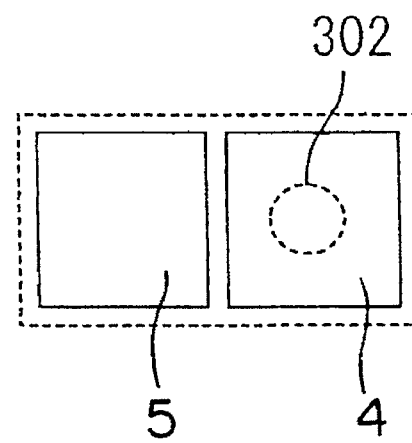
Figure 3D:
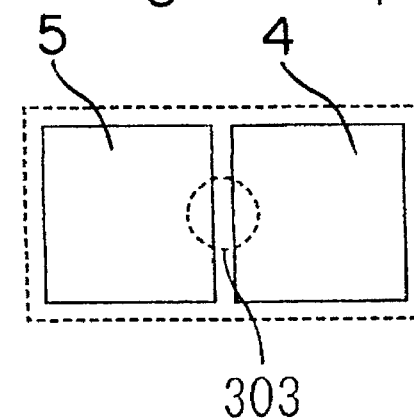

Different states of the light receiving elements are shown in FIGS. 3(a)–3(d). FIG. 3(a) shows a state in which neither of the light receiving elements 4 and 5 receives light. FIG. 3(b) shows a state in which the reflective object 204 is located at a far distance and a light spot 301 strikes the light receiving element 5. FIG. 3(c) shows a state in which the reflective object 204 is located at a near distance and a light spot 302 strikes the light receiving element 4. FIG. 3(d) shows a state in which the reflective object is located at a boundary between the far and near distances and the light spot 303 strikes both light receiving elements 4 and 5.

Figure 1:
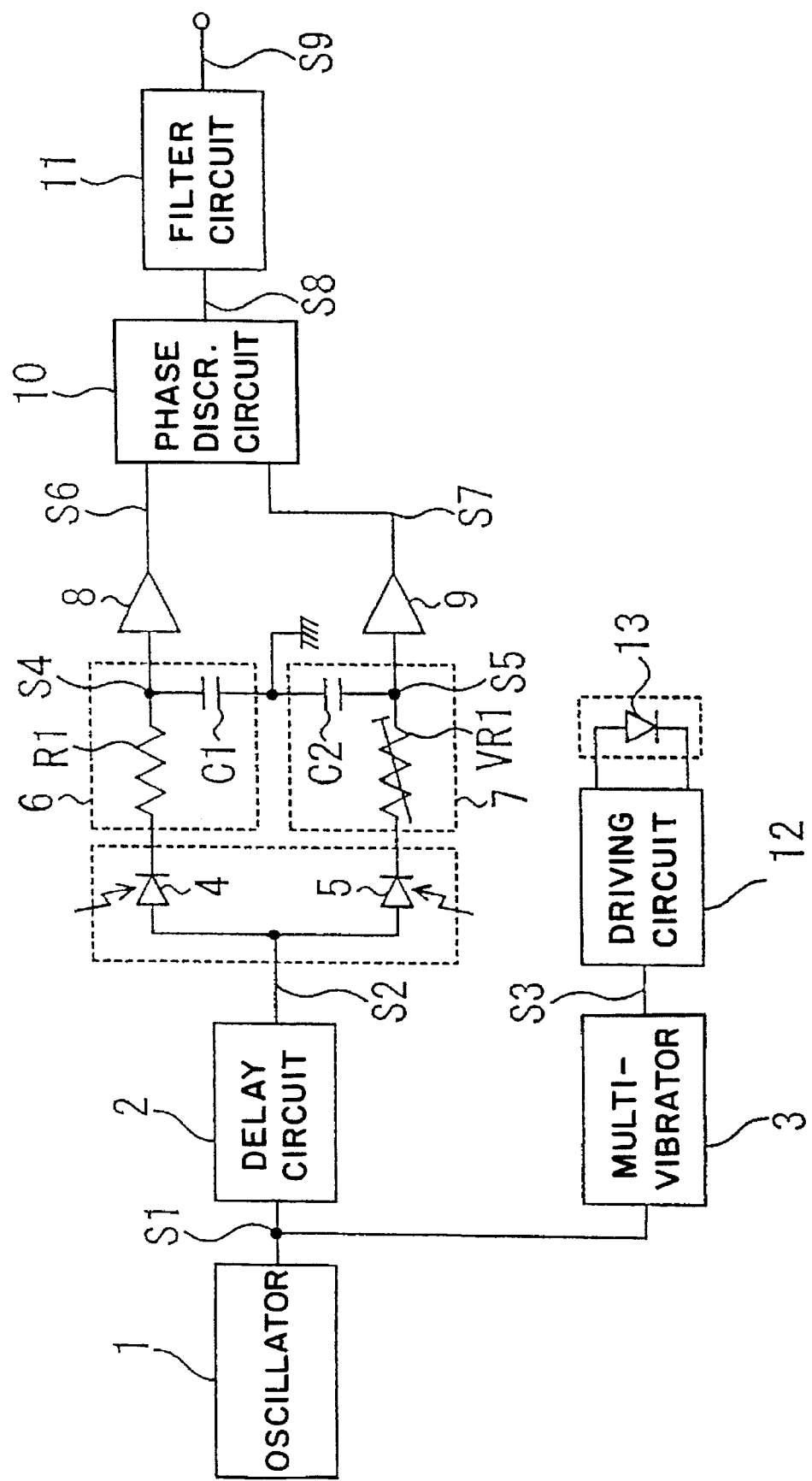
FIG. 1 is a block diagram of a distance measuring apparatus according to a first embodiment of the present invention.

FIG. 1 is a block diagram of a circuit according to a first embodiment of the present invention. In this embodiment, it is judged whether the reflective object is located either at a far distance or at a near distance relative to a preset distance.

Referring to FIG. 1, an oscillator 1 generates pulses of several hundred Hz to several hundred kHz consecutively when power is applied to the distance measuring apparatus by a known method, or when a start signal is entered. A pulse delay circuit 2 delays the output pulses of the oscillator 1 for a predetermined time. A one shot multivibrator 3 is connected to receive the output pulses from the oscillator 1 and generates pulses having a predetermined width in synchronization with the pulses of the oscillator 1. A light emitting element driving circuit 12 is connected to the one shot multivibrator 3 for driving a light emitting element 13 to emit pulsed light.

FIG. 1 shows an example in which photodiodes are used as the light receiving elements 4 and 5 shown in FIG. 2. The photodiodes 4 and 5 preferably have a uniform photoelectric conversion characteristic and a uniform heat characteristic. Anodes of the photodiodes 4 and 5 are both connected to the output of the pulse delay circuit 2 and the cathodes thereof are connected to delay circuits 6 and 7, respectively. The delay circuit 6 is an integrating circuit which comprises a capacitor C1 and a resistor R1. Similarly, the delay circuit 7 is an integrating circuit which comprises a capacitor C2 and a variable resistor VR1, and can adjust the delay time. It is understood that the variable resistor may be provided in the delay circuit 6 instead of the delay circuit 7.

A pair of binary circuits 8 and 9 in the form of a Schmidt trigger buffer are connected to the delay circuits 6 and 7 for generating an output when an input signal thereto exceeds a predetermined threshold. A phase discriminating circuit 10 compares the phases of the output signals of the binary circuits 8 and 9 to judge which of the two phases is advanced relative to the other. In this example, the phase discriminating circuit 10 generates an output signal when the fall of the output signal of the binary circuit 8 is more advanced than that of the binary circuit 9. The phase discriminating circuit 10 can be constituted of, for example, a D terminal and a clock terminal of a D flip-flop circuit. A filter circuit 11 filters the output signal of the phase discriminating circuit 10 to prevent an error in the operation of the circuitry caused by noise.

FIG. 4 is a timing chart showing the waveforms of pulses S1 through S8 at each point shown in the circuit of FIG. 1. Referring to FIG. 4, an upper level of the waveforms is referred to as a high level (hereinafter referred to as "H") whereas a lower level of the waveforms is referred to as a low level (hereinafter referred to as "L"). Further, in FIG. 4, the height of the waveforms S4 and S5 are shown on a scale of about two times that of the other signals. The operation of the first embodiment will be described by referring to FIGS. 1 and 4.

Referring to FIG. 4, when a pulse S2 which is a little delayed from an output pulse S1 produced by the oscillator 1 becomes "H", the capacitor C1 is charged relatively quickly approximately to a level of the applied voltage via the photodiode 4 and the resistor R1 as shown by waveform S4. When the voltage of the pulse S4 exceeds the threshold of the binary circuit 8, the pulse S6 becomes "H". When the pulse S2 becomes "L", charge accumulated in the capacitor C1 is discharged via the resistor R1 and the photodiode 4. At this time, the photodiode 4 assumes a reverse bias voltage, and the rate of discharge is determined by the photoconducting current. Namely, if reflected light from the object is incident on the photodiodes 4 and 5, the charge accumulated in the capacitor C1 is discharged rapidly because the photoconducting current is large. If no reflected light is incident on the photodiodes, the charge accumulated in the capacitor C1 is discharged by a dark current. Consequently, the photocurrent is small and discharges the capacitor C1 very slowly. When the voltage of the pulse S4 falls to a level of the threshold Vth of the binary circuit 8 or less, the pulse S6 becomes "L".

Therefore, the delay time changes at the time of the fall of the pulse S6 depending on whether the reflected light to the photodiode 4 is present or not. Since the pulse S2 is also applied to the photodiode 5, the capacitor C2 is charged and discharged in the same manner with the result that the delay time also changes at the time of the fall of the pulse S7, depending on whether the reflected light to the photodiode 5 is present or not. In other words, in accordance with the present invention, light receiving elements 4 and 5, resistor R1 and variable resistor VR1, and capacitors C1 and C2 constitute a variable delay circuit. The phase discriminating circuit 10 compares the phases of the pulses S6 and S7 at the time of the fall thereof. When the level of the pulse S6 is "H" at the time of the fall of the pulse S7, the pulse S8 is "L". On the other hand, when the level of the pulse S6 is "L" at the time of the fall of the pulse S7, the pulse S8 becomes "H". The phase of the pulse S7 at the time of the rise is irrelevant.

Consequently, the light emitting diode 13 may be driven to emit light pulses in synchronization with the fall of the pulse S1. The light emitting time is sufficient when the time is somewhat longer than a time in which the voltages of pulses S4 and S5 becomes equal to the threshold Vth or less. This results in less consumption of current and thus conserves energy.

The reason why the light emitting diode 13 is driven a little before the fall of the delayed pulse S2, which is applied to the photodiodes 4 and 5, is that in consideration of the response characteristics of the photodiodes a time is set from the fall of the reflected light on the photodiodes until the stabilization of the photocurrent. The pulse delay circuit 2 may be omitted, however, and the output S1 of the oscillator 1 may be directly connected to the anode of the photodiodes.

Referring to FIG. 4, as shown in FIG. 3(a), neither the photodiode 4 nor the photodiode 5 receives reflected light due to the absence of the reflective object 204 during a time period T1. In this state, the fall of the pulse S7 may be advanced by a predetermined time ΔT1 more than the counterpart of the pulse S6 by the adjustment of the variable resistor VR1. In this state, the output of the phase discriminating circuit 10, namely the pulse S8, is "L". When photodiodes 4 and 5 having uniform characteristics are used, the delay circuits 6 and 7 can have approximately the same structure. Thus the delay time of the pulses S4 and S5 changes in the same direction even under environmental changes such as temperature or the like so that phase reversal can be prevented.

As shown in FIG. 3(b), the reflective object 204 is located at a far distance and the light spot 301 falls on the photodiode S5 during a time period T2. Since the photocurrent in the photodiode S5 increases, the pulse 5 is abruptly attenuated. The delay time of the pulse S7 becomes small and the phase difference ΔT2 between the pulse S6 and the pulse S7 expands but is directed in the same direction as shown in FIG. 3(a). Thus the output pulse S8 remains "L". As shown in FIG. 3 (c), the reflective object 204 is located at a near distance and the light spot 302 falls on the photodiode 5 during a time period T3. Contrary to FIG. 3(b), since the photocurrent of the photodiode 4 increases, the pulse S4 is abruptly attenuated, the delay time of the pulse S6 becomes small, the fall of the pulse S6 is advanced by ΔT3 more than the counterpart pulse S7, and the output pulse S8 of the phase discriminating circuit 10 becomes "H". Consequently, it is possible to estimate how far the distance to the object is by monitoring the output pulse S8.

Figure 5:
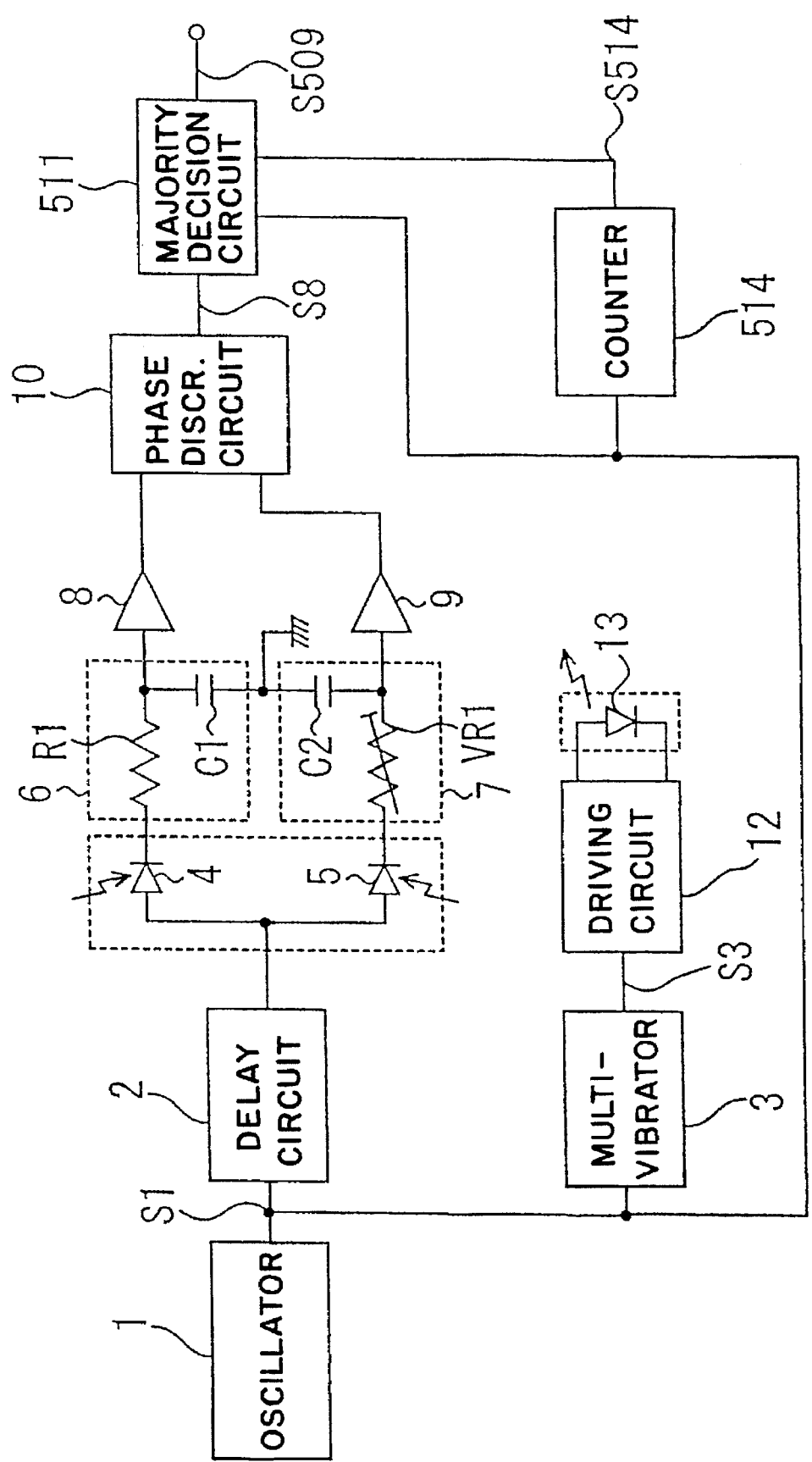
FIG. 5 is a block diagram of a distance measuring apparatus according to a second embodiment of the present invention.
Figure 6:
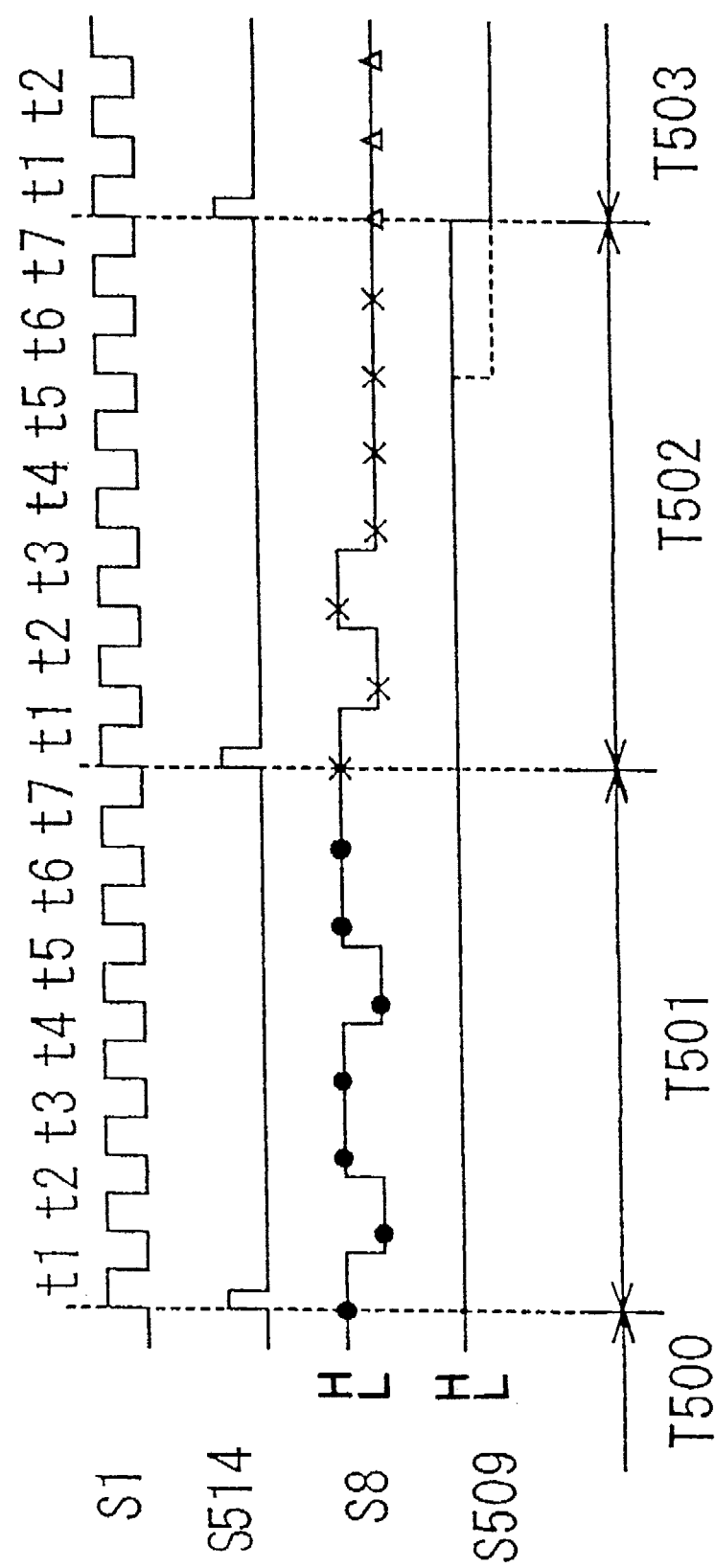
FIG. 6 is a timing chart of the second embodiment of the present invention.

When the reflective object 204 is located in the vicinity of the boundary between the near distance and the far distance, the reflected light falls on both of the photodiodes 4 and 5 (see FIG. 3(d)). In such a case, a second embodiment is shown to identify relatively clearly whether the distance is far or near. FIG. 5 is a block diagram of the circuit of the second embodiment, and FIG. 6 is a timing chart showing the waveforms of pulses S1, S514, S8 and S509 at each point shown in FIG. 5. In FIG. 5, like numerals designate like parts in FIG. 1.

Referring to FIG. 5, a counter 514 is connected to the oscillator 1 for counting the output pulses S1 of the oscillator 1 and for outputting a pulse S514 after counting a predetermined number of pulses S1. In FIG. 6, a pulse S514 having a predetermined width is output for every seven counted pulses S1. A majority decision circuit 511 is connected to receive the output pulses S8 from the phase discriminating circuit 10, the oscillator pulses S1 and the pulses S514 from the counter 514, and detects the ratio of the output level of the pulses S8 between each two consecutive pulses S514 and outputs the output level which is input the most often (i.e., the majority of the time).

The operation of the circuit shown in FIG. 5 up until the pulse S8 is obtained is the same as that described above with reference to the first embodiment shown in FIG. 1. Assuming that the pulses S8 are output as shown in FIG. 6, during the time T501, looking at the level of the pulses S8 at the time of the rise of the pulses S1 (t1 through t7), the level of the pulses S8 is "L" only at t2 and t5, and the ratio of "H" to "L" is 5 to 2. Consequently, the output S509 of the majority decision circuit 511 outputs "H" at the last stage of the period T501 (in other words, at the first stage of the period T502). In like manner, since the level of the pulses S8 is "H" only at t1 and t3 during the period T502, and the ratio of "H" to "L" is 2 to 5, the output S509 of the majority decision circuit 511 outputs "L" at the last stage of the period T502. The fact that the pulse S509 is "H" during the period T501 indicates that the level of the pulses S8 is "H" at a high ratio during the period T500.

In this particular embodiment, the oscillation pulse is delayed by seven cycles until it can be determined whether the distance is far or near. Since four "L's" are counted at the time the prescribed number of levels are counted at the first stage of each period, namely at the rise t6 during the period T502, the pulse S509 may be set to "L" at the time denoted by a dotted line. It is possible to take various other measures, such as increasing the oscillation frequency or the like, depending upon the application. In the aforementioned embodiment, although the counter 514 is set to produce outputs at every seven pulses, this count value need not be seven and may be any desired value. However, an odd number is desirable because a majority thereof must be decided.

Figure 7:
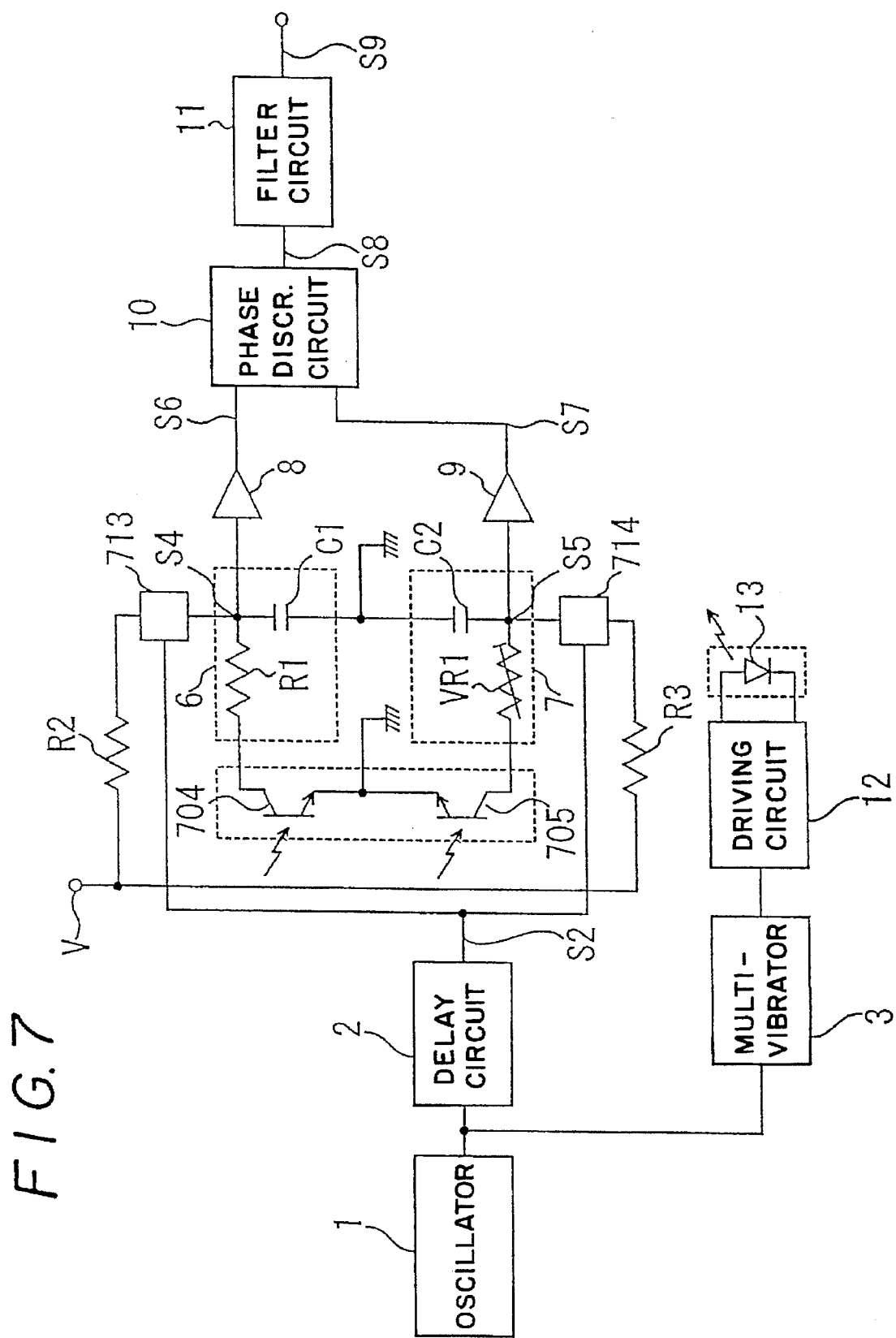
FIG. 7 is a block diagram of a distance measuring apparatus according to a third embodiment of the present invention.

FIG. 7 shows a block diagram of a circuit according to a third embodiment of the present invention. In FIG. 7, like numerals designate like parts in FIG. 1. Referring to FIG. 7, the light emitting elements comprise phototransistors 704 and 705. Reference numerals 713 and 714 comprise switches which are closed when the pulse S2 is "H" and are open when the pulse S2 is "L". Reference characters R2 and R3 comprise resistors.

The operation of the third embodiment is approximately the same as the first embodiment. The operation will be explained by referring to the timing chart shown in FIG. 4. Referring to FIGS. 7 and 4, when the pulse S2 becomes "H", the switches 713 and 714 are closed so that current flows through the resistors R2 and R3 from the power source V to charge both the capacitors C1 and C2 (see S4 and S5 in FIG. 4). Then, when the pulse S2 becomes "L", the switches 713 and 714 are open, with the result that an electric charge accumulated in the capacitors C1 and C2 is discharged via the resistor R1 and the phototransistor 704, as well as the variable resistor VR1 and the phototransistor 705. The discharged current varies depending on whether reflected light is incident on the phototransistor, as in the first embodiment. As a consequence, the discharge time changes, and the delay time at the fall of the pulses S6 and S7 changes.

Similarly to the first embodiment, the phases of the pulses S6 and S7 are identified by the phase discriminating circuit 10. When the fall of the pulse S7 appears before the pulse S6, it is possible to judge that the distance is far by the "L" output of the pulse S8. When the fall of the pulse S7 appears after the pulse S6, it is possible to judge that the distance is near by the "H" output of the pulse S8.

In the aforementioned embodiments, only near and far distances are identified. However, these embodiments can be expanded so that a plurality of distances can be identified.

Figure 8:
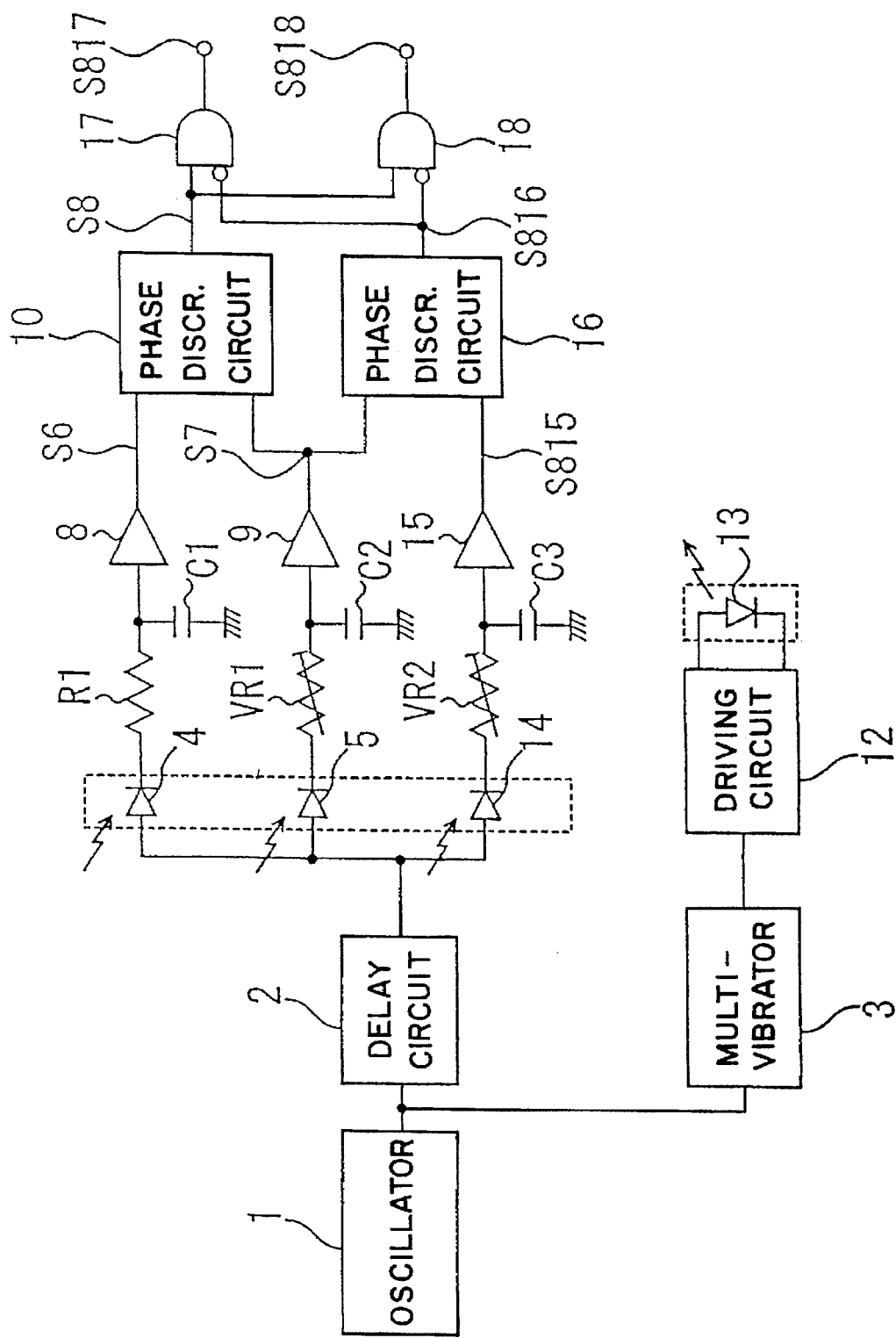
FIG. 8 is a block diagram of a distance measuring apparatus according to a fourth embodiment of the present invention.

As a fourth embodiment, FIG. 8 shows an example of a distance measuring apparatus that is capable of identifying a far distance, a medium distance and a near distance. The distance measuring apparatus according to the fourth embodiment is formed by adding a delay circuit comprising a photodiode 14, a variable resistor VR2 and a capacitor C3, a binary circuit 15, a phase discriminating circuit 16 and AND gates 17,18 to the first embodiment. The outputs of the AND gates 17 and 18 become "H" when "L" is input to the inverted input terminal marked in the drawing with a small circle and "H" is input to the non-inverted input terminal not marked by a circle. The filter circuit 11 in FIG. 1 is omitted in FIG. 8.

Photodiodes 4, 5 and 14 are arranged in an array adjacent to the rear portion of the light receiving lens. When the distance to the reflective object is far, medium or near, the distance measuring apparatus is constructed so that the light spot of the reflected light falls on either of the photodiodes 4, 5 and 14. The variable resistors VR2 and VR1 are adjusted so that the phase relationship when the pulses fall advances in the order of S815, S7 and S6 when light is not incident on any of the photodiodes, i.e., when the pulse S8 becomes "L" earlier than any of the other pulses.

The phase discriminating circuit 16 is the same as the phase discriminating circuit 10. When the fall of the pulse S7 advances ahead of that of the pulse S815, the phase discriminating circuit 16 outputs "H". The relationship between the pulses S7 and S8 is the same as that of the first embodiment. When light does not fall on all the photodiodes and when the light falls on the photodiode 14, the outputs of both the phase discriminating circuits 10 and 16 are "L" and the outputs of the AND gates 17 and 18 are both "L".

In the case where the reflective object is located at a medium distance and light falls on the photodiode 5, the outputs of the phase discriminating circuits 10 and 16 respectively become "L" and "H". Consequently, the output S818 of the AND gate 18 becomes "H". In addition, in the case where the reflective object is located at a close distance and light falls on the photodiode 4, the outputs of the phase discriminating circuits 10 and 16 become "H" and "L", respectively. Thus, in turn, the output S817 of the AND gate 17 becomes "H". Therefore, the distance to the reflective object can be identified as either far, medium or near. In the same manner, it is possible to increase the number of areas to be identified.

In accordance with the structure of the present invention, analog circuits, such as an amplifier with high amplification and comparators, are not required because a plurality of delay circuits are provided, and the light receiving elements are forced to be associated with the delay time. Since signals can be digitally processed in almost all cases, the circuit is simple and can be constructed inexpensively. In addition, since the characteristics of the plurality of delay circuits and the binary circuits can be substantially uniformly constructed, a distance measuring apparatus can be constructed with little change in the distance measurement characteristics even under environmental changes. Further, operational errors due to noises can be alleviated by connecting a majority decision circuit to the output of a phase discriminating circuit.

I claim:

1. A distance measuring apparatus comprising: an oscillator for generating pulses; a light emitting element for emitting light for a predetermined time a driving circuit for driving the light emitting element to emit light in synchronization with the pulses generated by the oscillator; a position sensitive device having a plurality of light receiving elements disposed adjacent to each other for receiving reflected light emitted by the light emitting element and reflected by an object whose distance is to be measured and for producing a corresponding output signal from each light receiving element according to a position of the received light; a plurality of delay circuits connected to respective ones of the plurality of light receiving elements; and a phase discriminating circuit for comparing the phases of output signals of the plurality of delay circuits so as to detect the distance of the object.

2. A distance measuring apparatus according to claim 1; wherein at least one of the delay circuits comprises an integrating capacitor and a variable resistor.

3. A distance measuring apparatus according to claim 1; wherein the light emitting element is a light emitting diode.

4. A distance measuring apparatus according to claim 1; further comprising a case for housing the light emitting element and the position sensitive device and having first and second focusing lenses, wherein the light emitting element is disposed to emit light through the first focusing lens at a predetermined angle so as to reflect off the object and be projected onto the position sensitive device through the second focusing lens at an angle of incidence determined in accordance with the distance between the object and the case.

5. A distance measuring apparatus according to claim 1; further comprising a delay circuit connected to the oscillator for delaying the pulses and producing a delayed pulse output; and a one-shot multivibrator for receiving the pulses from the oscillator and producing a synchronous pulse output for driving the driving circuit.

6. A distance measuring apparatus according to claim 1; wherein the delay circuits each comprise an integrating capacitor and a shunt resistor.

7. A distance measuring apparatus comprising: an oscillator for generating pulses; a light emitting element for emitting light for a predetermined time; a driving circuit for driving the light emitting element to emit light in synchronization with the pulses generated by the oscillator; a position sensitive device having a plurality of light receiving elements disposed adjacent to each other for receiving reflected light emitted by the light emitting element and reflected by an object whose distance is to be measured and for producing a corresponding output signal from each light receiving element according to a position of the received light; a plurality of delay circuits connected to respective ones of the plurality of light receiving elements; a phase discriminating circuit for comparing the phases of output signals of the plurality of delay circuits; and a majority decision circuit for counting the number of times the output level of the phase discriminating circuit is High or Low for each predetermined time period and outputting a signal having a level corresponding to that which occurred most often during the predetermined time period so as to detect the distance of the object and eliminate noise.

8. A distance measuring apparatus according to claim 7; wherein the light emitting element is a light emitting diode.

9. A distance measuring apparatus according to claim 7; further comprising a case for housing the light emitting element and the position sensitive device and having first and second focusing lenses, wherein the light emitting element is disposed to emit light through the first focusing lens at a predetermined angle so as to reflect off the object and be projected onto the position sensitive device through the second focusing lens at an angle of incidence determined in accordance with the distance between the object and the case.

10. A distance measuring apparatus according to claim 7; further comprising a delay circuit connected to the oscillator for delaying the pulses and producing a delayed pulse output; and a one-shot multivibrator for receiving the pulses from the oscillator and producing a synchronous pulse output for driving the driving circuit.

11. A distance measuring apparatus according to claim 7; wherein the delay circuits each comprise an integrating capacitor and a shunt resistor.

12. A distance measuring apparatus according to claim 7; wherein at least one of the delay circuits comprises an integrating capacitor and a variable resistor.

13. An active trigonometrical distance measuring apparatus comprising: an oscillator for generating pulses; a light emitting element for emitting light for a predetermined time in synchronization with the pulses generated by the oscillator; a plurality of light receiving elements disposed adjacent to each other and spaced apart from the light emitting element for receiving reflected light emitted by the light emitting element and reflected by an object whose distance is to be measured and for producing an output signal from each light receiving element according to a position of the received light; a plurality of delay circuits connected to respective ones of the plurality of light receiving elements for delaying the output signals of the light receiving elements; and a phase discriminating circuit for comparing the phases of output signals of the plurality of delay circuits and detecting a distance to the object in accordance with a result of the comparison.

14. An active trigonometrical distance measuring apparatus comprising: an oscillator for generating pulses; a light emitting element for emitting light for a predetermined time in synchronization with the pulses generated by the oscillator; a plurality of light receiving elements disposed adjacent to each other and spaced apart from the light emitting element for receiving reflected light emitted by the light emitting element and reflected by an object whose distance is to be measured and for producing a corresponding output signal from each light receiving element according to a position of the received light; a plurality of delay circuits connected to respective ones of the plurality of light receiving elements for delaying the output signals of the light receiving elements; a phase discriminating circuit for comparing the phases of output signals of the plurality of delay circuits; and a majority decision circuit for counting the number of times the output level of the phase discriminating circuit is High or Low for each predetermined time period and outputting an adjusted signal having a level corresponding to that which occurred most often during the predetermined time period and detecting a distance of the object in accordance with the adjusted signal so as to decrease the effects of noise.

* * * * *